(No Model.) 3 Sheets—Sheet 1.
P. VAN DE WESTELAKEN.
PASTEURIZING BOTTLED LIQUIDS.
No. 593,140. Patented Nov. 2, 1897.
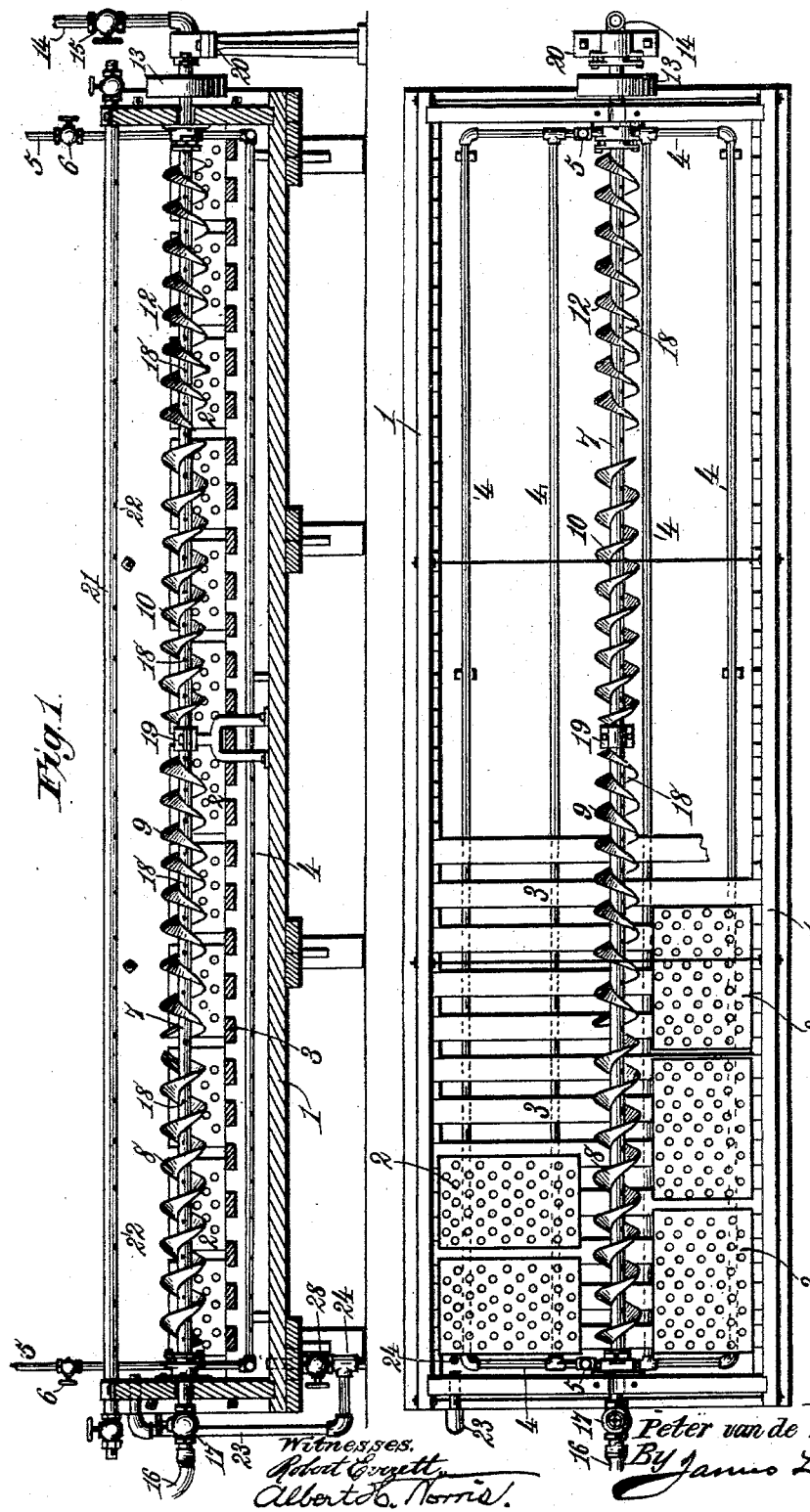
Inventor
Peter van de Westelaken.
By James L. Norris.
Atty.

(No Model.) 3 Sheets—Sheet 2.
P. VAN DE WESTELAKEN.
PASTEURIZING BOTTLED LIQUIDS.
No. 593,140. Patented Nov. 2, 1897.
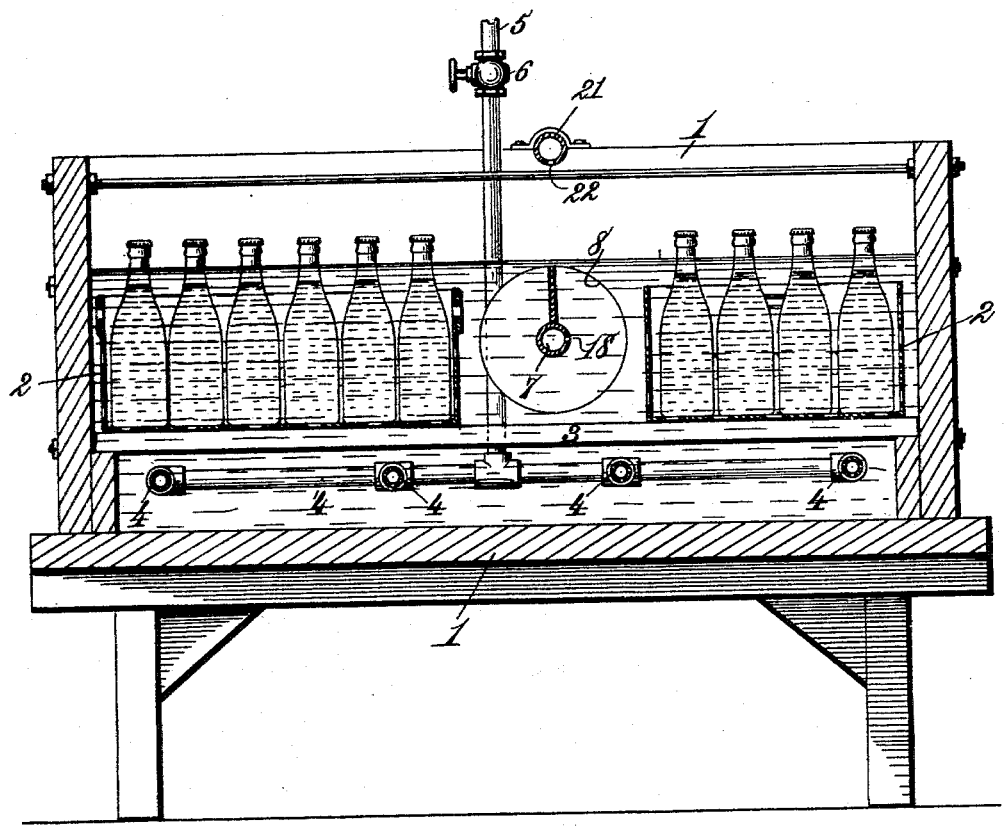
Witnesses.
Robt Everett,
Albert H. Norris.
Inventor:
Peter van de Westelaken.
By James L. Norris.
Atty.

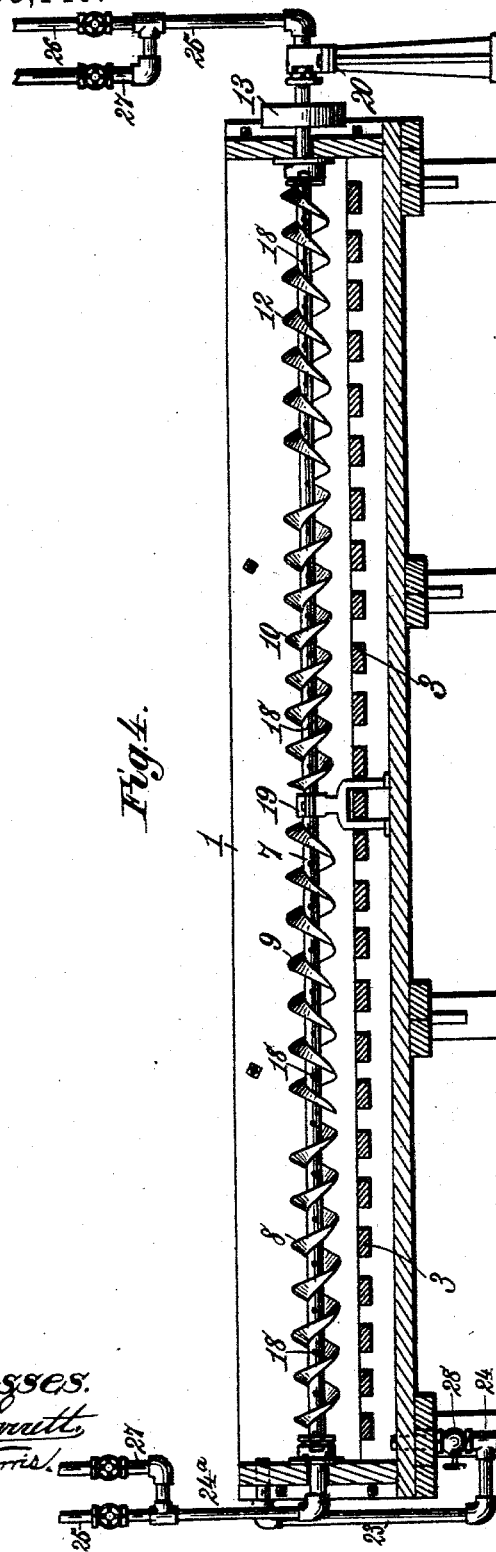

UNITED STATES PATENT OFFICE.

PETER VAN DE WESTELAKEN, OF ALEXANDRIA, VIRGINIA, ASSIGNOR TO HIMSELF, PERCY McKNIGHT BALDWIN, JOHN T. SWEENEY, JOHN T. JOHNSON, AND EMANUEL F. DOWNHAM, OF SAME PLACE.

PASTEURIZING BOTTLED LIQUIDS.

SPECIFICATION forming part of Letters Patent No. 593,140, dated November 2, 1897.

Application filed May 4, 1897. Serial No. 635,031. (No model.)

*To all whom it may concern:*

Be it known that I, PETER VAN DE WESTELAKEN, a citizen of the United States, residing at Alexandria, in the county of Alexandria and State of Virginia, have invented new and useful Improvements in Pasteurizing Bottled Liquids, of which the following is a specification.

In pasteurizing beer and other liquors contained in corked or stoppered bottles to destroy the living particles of yeast, fungi, and spores for improving the quality and insuring the preservation of the beer the bottles are partially or wholly submerged in a body of water contained in a capacious tank. The water is first gradually heated by steam to the required temperature and is then gradually cooled to place the beer in the proper or best condition for the market.

A source of considerable expense, not to mention annoyance and vexation, incident to ordinary methods or processes of pasteurizing bottled beer resides in the breakage of a comparatively large number of bottles in each charge placed in the tank for treatment. The filled and corked bottles break not only during the time that the water is gradually heated to a temperature of about 55° Réaumur, but also during the time that the water is gradually cooled, due to the fact that all particles of the body of water in the tank are not by the means usually employed equally or uniformly heated and subsequently cooled. Many attempts have been made to provide a pasteurizing apparatus wherein water will be equally or uniformly heated throughout its extent to avoid breakage of bottles during the heating step, but none, so far as I am aware, have been entirely satisfactory and successful, chiefly because of the difficulty of quickly heating all particles of the body of water to exactly or nearly the same temperature, and also because proper provision has not been made for rapidly cooling all particles of the body of water equally or uniformly during the cooling step.

It has been proposed to avoid breakage of bottles during the pasteurizing process by securing a circulation of the water both during the heating and cooling steps, but the slow motion incident to circulation heretofore obtained is insufficient to secure the result of heating or cooling all particles of the body of water to exactly or nearly exactly the same temperature in a comparatively short period of time.

I have discovered that the serious objection incident to pasteurizing bottled beer, residing chiefly in the breakage of bottles, is entirely avoided by violent agitation of practically all particles of the body of water contained in the pasteurizing-tank during the time the water is being heated and while it is being cooled. This agitation is not a mere circulation of the water at comparatively slow speed, nor is it confined to any particular point in the body of the water, but is distributed throughout the entire body of water, in consequence of which, if the water is being heated, the entire body of water can be rapidly heated and all particles thereof raised to exactly the same temperature, or nearly so, while if the water is being cooled the cold inflowing water will be quickly and uniformly distributed throughout the body of water in the tank, and thus the body of water is rapidly cooled and the temperature of all particles lowered to practically the same degree of temperature. By this means no one part of any bottle is subjected to a measurable degree of heat or cold greater than another part of such bottle, and consequently the danger of breakage in the heating and cooling steps is reduced to a minimum, if not absolutely avoided.

I have found by actual practice of the invention at the brewery of The Robert Portner Company, Alexandria, Virginia, that it is possible in about one hour to properly and successfully pasteurize at one charge of the tank sixty dozen properly filled and corked or stoppered bottles of beer without breakage of a single bottle, thereby saving the large expense incident to breakage of a large number of bottles in each charge during the sterilizing process.

The chief object of my present invention is to provide novel, simple, efficient, and economical means for agitating the water substantially the full length of the tank during the time the water is being heated and also during the time it is being cooled, whereby the entire body of water in the tank is practically heated uniformly and subsequently cooled uniformly.

The object of my invention is accomplished in the manner and by the means hereinafter described and claimed, reference being made to the accompanying drawings, in which—

Figure 1 is a longitudinal sectional view taken centrally through the pasteurizing-tank. Fig. 2 is a top plan view of the same, showing a portion of the false bottom to more clearly illustrate the steam heating-pipes by which the water in the tank is heated to the required temperature. Fig. 3 is a transverse sectional view of the same, and Fig. 4 is a longitudinal central sectional view showing a modification of the invention.

In order to enable those skilled in the art to make and use my invention, I will now describe the same in detail, referring to the accompanying drawings, wherein—

The numeral 1 indicates a water-holding tank of any capacity and construction suitable for the purpose in hand. I have actually used my invention in connection with a tank approximately twenty-two feet in length and five feet in width, adapted to contain at one charge seven hundred and twenty bottles of beer, which bottles are arranged in perforated metal baskets or boxes 2, placed in two rows, one row at each side portion of the tank, to provide a continuous longitudinal space between the two rows along the length of the tank, for a purpose which will hereinafter appear. The capacity of the tank can be increased or diminished any desired extent to suit the conditions required or the number of bottles which it is desired to place in the tank at one charge. The tank is provided at a short distance above its imperforate bottom wall with a false bottom of any desired construction, but composed, as here shown, of transverse slats 3, supported at their ends and separated one from another for the purpose of providing recesses or spaces through which water is susceptible of freely passing. The chamber beneath the false bottom is in Figs. 1, 2, and 3 designed to receive steam heating-pipes 4, supplied at the ends of the tank through the medium of steam-supply pipes 5, having a suitable globe or other valves 6. The steam heating-pipes extend horizontally the full length of the tank between its ends, and the pipes are distributed in a manner suitable to heat the water in the tank until it reaches the required temperature.

In the continuous longitudinal space between the two rows of bottle-holding baskets or boxes is arranged a water-agitator extending substantially the full length of the tank between its ends and positively and swiftly driven by mechanical power from the exterior of the tank in such manner that it will violently agitate practically all particles of the body of water contained in the tank, thereby rapidly distributing the heated particles of the water throughout the entire tank for the purpose of gradually but quickly heating all particles of the body of water to exactly or nearly the same temperature. The agitator, as here shown, is composed of a horizontal shaft 7, having its ends mounted in suitable bearings carried by the end walls of the tank and provided with a plurality of rigidly-attached helical blades 8, 9, 10, and 12, which are distributed along the shaft the entire length thereof between the bearings in which the shaft is adapted to rotate. The helical blades 8 and 10 extend in a spiral path the reverse of the helical blades 9 and 12, so that the water is forcibly driven back and forth longitudinally and back and forth laterally, thus producing such commotion that all particles of the water contained in the tank are rapidly thrown about in all directions, and the particles as they become heated in juxtaposition to the steam heating-pipes are quickly distributed throughout the tank, which results in the gradual but rapid raising of the temperature of the water and the heating of practically every particle thereof to exactly or approximately the same degree.

As before stated, the agitator is positively driven by mechanical power from a point outside the tank, and while this may be effected in many different ways I prefer to drive the agitator through the medium of a pulley 13, secured to the shaft outside the tank, Figs. 1 and 2, and adapted to be rapidly rotated by a belt connection with a suitable power-driven shaft not necessary to illustrate. As here shown, the agitator-shaft is in communication at its ends with water-supply pipes 14 and 16, having suitable valves 15 and 17. The shaft is hollow or tubular, and at various points along its length it is constructed or provided with jet orifices or perforations 18, through which water will pass when permitted to flow into the shaft under pressure from the supply-pipes 14 and 16. The shaft is supported centrally between its ends through the medium of a shaft-bearing 19, supported by the bottom wall of the tank and projecting a suitable distance above the false bottom. The end of the shaft to which the driving-pulley 13 is secured may be and is preferably supported by a pillow-block 20, having a bearing in which the shaft rotates and provided with a suitable coupling for the attachment of the water-supply pipe 14. The construction is preferably such that while the agitator-shaft rapidly rotates the water-inlet pipes 14 and 16 remain motionless or are non-rotary An elevated water-supply pipe 21 is shown as arranged longitudinally along the top portion of the tank and is constructed with jet orifices or perforations 22 throughout its length between the ends of the tank. This pipe is designed to connect with a water-supply, so that a secondary supply of water may be introduced into the tank. The pipe may be supported in any suitable manner, but as here shown it is mounted directly upon the end walls of the tank.

The tank is provided with an overflow-pipe 23, which, as shown, extends to and communicates with a tank-discharging pipe 24. It is proper to state here, however, that I do not wish to be understood as limiting myself to any particular means for introducing the water into the tank, heating the water in the tank, and supplying the cool water.

I have illustrated in Figs. 1, 2, and 3 practicable and satisfactory means for filling or nearly filling the tank and for heating the water and for introducing cool water whenever required, but the same results can be otherwise accomplished. For instance, in the modification Fig. 4, where the same reference-numerals hereinbefore used indicate parts corresponding to those previously described, I show the hollow or tubular shaft of the agitator provided at its ends with pipes 24ª and 25, each of which connects with a water-supply pipe 26 and a steam-supply pipe 27, whereby it is possible to first introduce steam into the agitator-shaft, so that it will pass directly into the tank for heating the same, and subsequently it is possible to shut off the steam and permit cold water to flow into the agitator-shaft and pass therefrom into the water in the tank.

In pasteurizing bottled beer according to my invention the bottles should be properly filled and corked or stoppered and then placed in the metal baskets or boxes, which are located in two rows, one row at each side portion of the tank. Ordinarily the tank is supplied with a sufficient quantity of water that the bottles are immersed up to or near their corked or stoppered mouths, but they may be entirely submerged. The steam is then permitted to flow into the steam heating-pipes or into the tubular agitator-shaft, and the agitator is positively and rapidly rotated by mechanical power, as before explained. The temperature of the water is gradually raised to about 35° Réaumur, at which temperature it is held for ten minutes, more or less, and is then raised to about 55° Réaumur and held at this temperature about thirty minutes. I suggest twenty minutes be allowed to raise the temperature from 35° Réaumur to 55° Réaumur, but I do not wish to be understood as confining myself with precision to the degree of heat or the time for raising the temperature, as above set forth.

During the time the steam is supplied to the steam heating-pipes or to the agitator-shaft the agitator is rapidly rotating and acting upon the water the full length of the tank. The reverse helical blades violently agitate the water and move some parts thereof back and forth longitudinally and other parts laterally in opposite directions, so that such a commotion is produced that practically every particle of water in the tank is in violent motion.

The helical agitator on the rotary shaft acts to move the water laterally and to distribute it to the bottle-holding receptacles arranged along opposite sides of the tank practically the full length thereof. By constructing the helical blade with portions running lengthwise of the shaft first in one direction and then in the opposite direction the water is not only moved laterally but longitudinally in opposite directions at different portions of the tank. The lateral and other motions of the water in the tank can be made rapid or slow by increasing or decreasing the speed of rotation of the shaft.

After the beer is heated, as above set forth, it is essential that the bottles and the beer contained therein be properly and rapidly cooled for the purpose of placing the beer in the proper or best condition for the market, so that its quality is improved and it is preserved and can be kept for a long time without danger of fermentation or deleterious changes. In the cooling step the steam is shut off and cool water is permitted to flow into the tank in any suitable manner, preferably through the medium of the devices illustrated in the drawings hereinbefore described. As the cool water flows into the water already in the tank the cooler particles of water are swiftly distributed throughout the tank and the entire body of water gradually and uniformly cools, and no one part of any beer-bottle is cooled to a measurably greater or less extent than some other part or parts of such bottle, whereby breakage of bottles is reduced to a minimum, if not entirely avoided. If perfect bottles are properly filled and corked or stoppered, it is possible with my invention to pasteurize any number of bottles at one charge without breaking a single one by the heating or cooling action.

While the cool water is flowing into the tank for cooling the bottles, water should discharge from the tank in proportion to the quantity which is flowing thereinto. This can be conveniently effected by properly adjusting the valve 28 of the discharge-pipe 24. If the water-level in the tank rises above a certain point, some of the water will pass off through the overflow 23. In practice the water discharged from the tank is conveyed to another tank to economize in the use of water.

The equal or uniform heating of all particles of the water equalizes the heating of all parts of the bottles, and likewise the equal or uniform cooling of all the particles of water in the tank equalizes the cooling of all parts of the bottles.

In the practical use of the steam heating-pipes 4, arranged in the chamber beneath the false bottom of the water-tank, it is preferable to provide them with jet orifices or perforations in their lower sides, so that the steam can pass directly into the water; but it is possible to use the steam-pipes for heating purposes without providing them with such jet orifices or perforations.

Having thus described my invention, what I claim is—

1. The combination, in an apparatus for pasteurizing bottled liquids, of a water-tank having means for supporting the bottles therein, means for heating and subsequently cooling the water, a plurality of helical blades, one extending in a spiral path the reverse of another, and means for driving the helical blades, substantially as described.

2. The combination, in an apparatus for pasteurizing bottled liquids, of a water-tank, means for heating the water in the tank, a shaft having helical blades rotating in the water and one extending in a spiral path the reverse of another, and means for driving the shaft, substantially as described.

3. The combination, in an apparatus for pasteurizing beer in bottles, of a water-tank in which gangs of beer-bottles are supported along the opposite sides thereof, a shaft extending centrally the full length of the tank between the gangs of beer-bottles and having a helical water-agitator running substantially the full length thereof, and means for rotating the shaft from the exterior of the tank, substantially as described.

4. The combination, in an apparatus for pasteurizing beer in bottles, of a water-tank in which gangs of beer-bottles are supported along the opposite sides thereof, a perforated tubular shaft extending the full length of the tank between the gangs of bottles and having a helical water-agitator thereupon which runs substantially the full length of the shaft, means for introducing water into said shaft, and means for rotating the shaft, substantially as described.

In testimony whereof I have hereunto set my hand in presence of two subscribing witnesses.

PETER VAN DE WESTELAKEN.

Witnesses:
JAMES L. NORRIS,
LEONARD MARBURY.